No. 762,465.

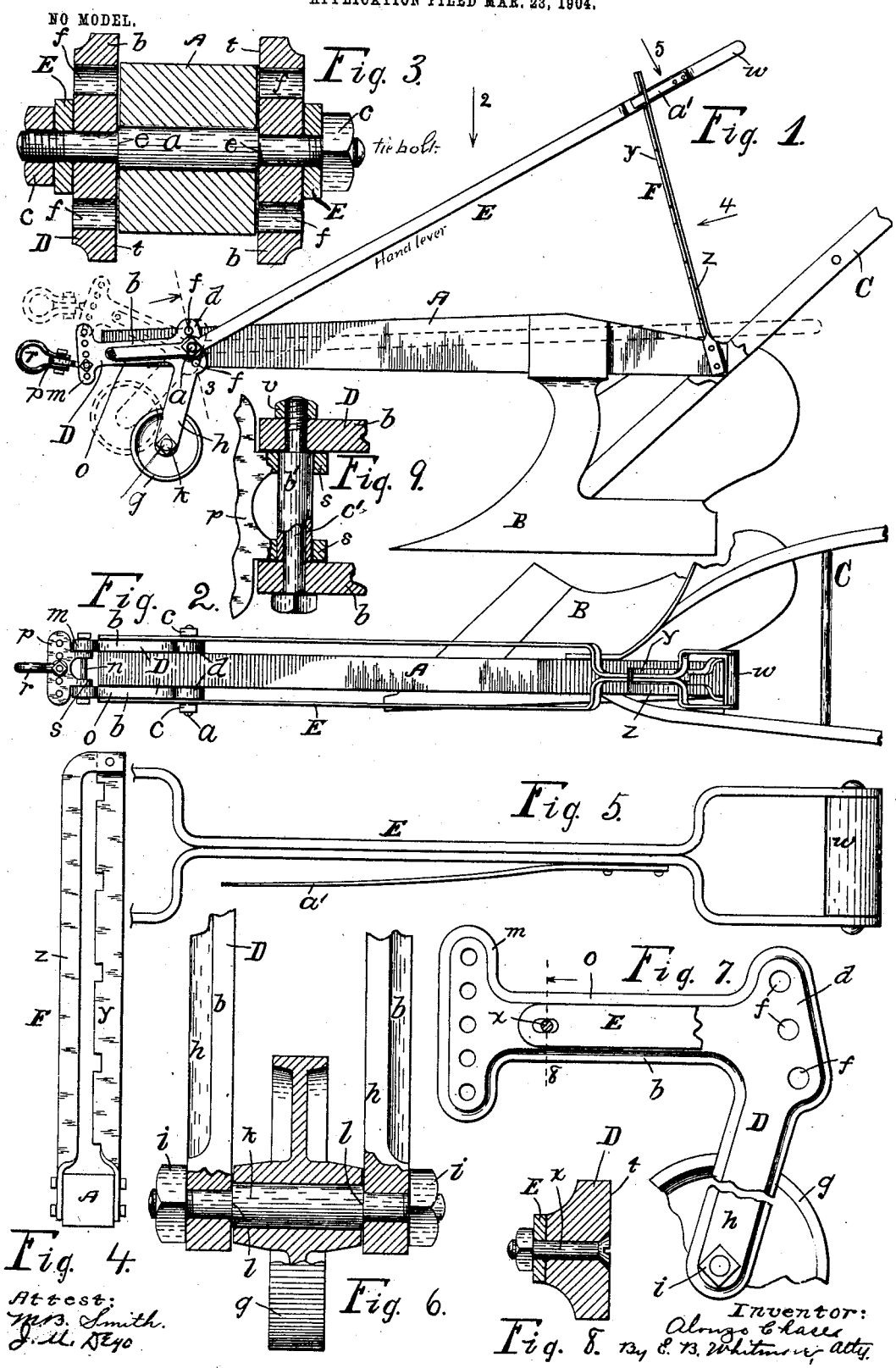

Patented June 14, 1904.

UNITED STATES PATENT OFFICE.

ALONZO CHASE, OF PALMYRA, NEW YORK.

ATTACHMENT FOR PLOWS.

SPECIFICATION forming part of Letters Patent No. 762,465, dated June 14, 1904.

Application filed March 23, 1904. Serial No. 199,603. (No model.)

*To all whom it may concern:*

Be it known that I, ALONZO CHASE, of Palmyra, in the county of Wayne and State of New York, have invented a new and useful Improvement in Attachments for Plows, which improvement is fully set forth in the following specification and shown in the accompanying drawings.

Farmers and others who use plows are aware that a plow will act differently in different kinds of ground and needs to be handled differently as changes in the nature of the soil are met while plowing a furrow—that is to say, in plowing a long furrow hard and soft soils are liable to be met with, as in passing over ridges and through low grounds or valleys, and in cutting the hard soils the plow is inclined to run nearer the surface and make a shallower furrow than when passing through softer and more yielding ground, and for the purpose of plowing a furrow of uniform depth in different soils the handles of the plow need frequently to be raised or depressed, which renders plowing laborious, especially when the handles need to be much lifted. Means have heretofore been devised to remedy this difficulty, and my present invention is designed as an improvement upon devices heretofore employed for the purpose.

The main object of my invention is to provide an attachment for plows by means of which the mechanism for controlling the plow may be quickly and conveniently changed at will when necessary to change the plow to cut a furrow of practically uniform depth, and while shifting said mechanism of the plow provision is also made for simultaneously changing the direction of the draft as to a horizontal plane of the team on the plow, which change in the direction of the pull of the team coacts with the shiftable mechanism to cause the plow to tend to cut a furrow of uniform depth. This simultaneous changing of the direction of the pull on the plow with the shifting of the controlling means is of great importance in the manner of making furrows of uniform depth in all kinds of soil.

Other objects and advantages of the invention will be brought out and made to appear in the following specification, and particularly pointed out in the appended claims, reference being had to the accompanying drawings, forming a part of this specification.

Figure 1 is a side elevation of an ordinary plow with my improved attachment in place thereon, parts being shown in two positions by full and dotted lines and parts broken away. Fig. 2 is a plan of the device, seen as indicated by arrow 2 in Fig. 1, with parts broken away. Fig. 3 is a cross-section of the beam of the plow and associated parts, taken on the dotted line 3 in Fig. 1. Fig. 4 is a rear elevation of the notched standard or rest for the hand-lever seen as indicated by arrow 4 in Fig. 1. Fig. 5 is a plan of the rear part of the hand-lever, better showing the construction, seen as indicated by arrow 5 in Fig. 1. Fig. 6 is a vertical section of a part of the ground-wheel and associated parts of the clevis-frame, parts being broken away. Fig. 7 is a side view of the clevis-frame detached, better showing its construction, parts being broken away. Fig. 8 is a cross-section of one side of the clevis-frame and the associated hand-lever, taken on the dotted line 8 in Fig. 7, further showing the construction. Fig. 9 is a horizontal section of the forward parts of the clevis-frame and associated parts, showing a modification of the forward tie-bolt. Figs. 3 to 9, inclusive, are drawn to various scales larger than that of Figs. 1 and 2.

Referring to the parts shown, A is the beam of the plow, B the iron body, and C the handles, all of which being substantially of common construction. To the forward end of the beam A, I attach a branched clevis-frame D, comprising two similar and equal right and left main parts or side pieces $b\ b$ of metal joined. This clevis-frame is usually secured to the beam A by means of a double-end tie-bolt $a$, Figs. 1, 2, and 3, passing horizontally through the beam and adapted to turn therein, the ends of the bolt being reduced to pierce the sides $b\ b$ of the frame and forming shoulders $e\ e$. Screw-nuts $c\ c$ on the respective ends of the tie-bolt serve to press the parts $b\ b$ of the frame tightly against the shoulders $e\ e$, as shown. The parts $d\ d$ at the angles of the side pieces $b\ b$ are expanded and usually formed with three, more or less, holes $f$, Fig. 7, through which to receive the ends of the tie-bolt $a$ for the purpose of setting the frame D higher or lower on the beam A, as necessity may require.

A wheel $g$, Figs. 1 and 6, is held between the lower ends of the branches $h\ h$ of the frame D for rolling upon the ground beneath the beam A and in advance of the point of the plow. This wheel is held to turn upon a tie-bolt $k$, similar to the bolt $a$, above described, the screw-nuts $i\ i$ serving to hold the adjacent parts $b\ b$ of the clevis-frame firmly against the respective shoulders $l\ l$ of the bolt.

The forward ends $m\ m$ of the upper branches $o\ o$ of the frame D are expanded vertically, as shown in Figs. 1 and 7, and pierced horizontally by a series of holes through which to receive a tie-bolt $n$, Fig. 2, for holding a coupling-plate $p$ for receiving the clevis $r$. This plate is formed with rearwardly-extended lugs $s$ between the sides $b\ b$ of the frame D and forming spacers for said sides, the bolt $n$ piercing said lugs, as shown in the figure. The inner faces $t\ t$ of the opposing parts $b\ b$ of the frame, Figs. 2, 3, and 8, next the sides of the beam A are flat, and the distances between the shoulders $e\ e$ and $l\ l$, respectively, of the tie-bolts $a$ and $k$ and between the outer vertical faces of the lugs $s\ s$ of the plate $p$ being equal when the threaded parts are turned snugly to place the frame D will be rigid, with the sides $b\ b$ parallel, and, further, the distance between the side pieces $b\ b$ being slightly greater than the horizontal thickness of the beam the rigid open frame D is free to turn in vertical directions on the end of the beam to raise or lower the wheel $g$, as may be required.

A hand-lever E, with its parts or branches on either side of the frame D and secured thereto, extends back in convenient reach of the plowman, the hand-lever terminating in a suitable handle $w$ and being guided and controlled by a notched standard or rest F, secured to the beam of the plow. This hand-lever is pierced by the ends of the tie-bolt $a$ and secured rigidly to the frame D by the threaded nuts $c\ c$, as shown in Figs. 1, 2, and 3, and further held to the frame by screw-bolts $x$, Figs. 1, 7, and 8, one through each branch of the lever. Thus held rigidly together the frame D and the lever E move as a single body, being practically a single lever of the first order turning on the fulcrum-pivot $a$, held in the forward end of the beam A of the plow, and it will be understood from viewing Fig. 1 that by moving the rear end of the lever upward or downward along the standard F the wheel $g$ will be depressed or raised, as the case may be, to determine the depth of the cut of the plow and that also the direction of the draft of the team upon the plow will be correspondingly changed—that is to say, if the lever E be raised to the top of the standard, as shown in full lines in the figure, the wheel and the clevis $r$ will both be carried downward, the wheel serving to lift the end of the beam and the draft on the clevis being inclined more sharply upward, so that the effort of the team will also tend to raise the beam, both acting together to accomplish the same result, and if the lever be carried down onto the beam, as indicated by dotted lines, the wheel and the clevis will both be lifted, the former allowing the end of the beam to descend and the pull upon the clevis being rendered less in an upward direction, and so more favorable to a descent of the beam for admitting of a deeper cut for the plow.

The standard F consists of a notched bar $y$, secured to one side of the beam, and a plain holding or confining bar $z$, secured to the other side of the beam parallel with the bar $y$, with their edges turned toward each other, the lever E playing between the bars, as appears in Figs. 1 and 2. A spring $a'$, Figs. 1, 2, and 5, is secured to the side of the lever in position to press the edge of the bar $z$, and so hold the lever normally in one or another of the notches of the bar $y$, accordingly as the lever is shifted, this being done at any time when necessary by the plowman carrying the lever laterally out of the notch and moving it up or down along the space between the opposing bars $y$ and $z$ to another notch.

The lever or part E being secured rigidly to the clevis-frame D both parts together constitute practically a single lever or lever-body, with branches $o$, $h$, and E turning on the tie-bolt $a$ as a fulcrum. The parts being of metal and the lever E being long and slender the whole is susceptible of spring action, on account of which when the plow suddenly encounters bodies that do not readily yield—as stones, for example—the temporary springing or yielding of the lever-body as a whole saves the team from disagreeable and injurious shocks and the harness from destructive strains.

In constructing these attachments for plows I do not wish to confine myself to the exact form of tie-bolt with enlarged middle parts and reduced ends. (Shown in Figs. 3 and 6.) A construction that as well answers the purpose is shown in Fig. 9, in which a tubular part $b'$ upon a simple or ordinary straight bolt $c'$ takes the place of the enlarged middle parts of the tie-bolts, (indicated by the reference-letters $a$ and $k$.) This tube $b'$ serves as a spacer for the parts $b\ b$ of the frame D, and its ends act as shoulders against which the headed bolt $c'$ and the screw-nut $v$ firmly hold the parts $b\ b$ in constructing the rigid frame D.

What I claim as my invention, and desire to secure by Letters Patent, is—

1. A plow having a metal frame mounted on the front end of the beam and having forwardly and downwardly extending branches and adapted to turn in vertical directions thereon, a wheel carried by the downwardly-extending branches of said frame beneath the beam and a holder for the clevis carried by the frame forward of the beam, and means pivoted on the pivot of the said frame to turn the frame on the beam.

2. A plow having a metal frame formed with branches mounted on the beam, a wheel carried by one branch of the frame and a holder for the clevis carried by another branch of the frame, and means pivoted on the pivot of the said frame for tilting the frame and means for vertically adjusting said frame on the beam.

3. A plow having a branched lever mounted to turn on the beam, a frame with forwardly and downwardly extended branches and secured to said lever, a wheel carried by a rigid branch of the frame, a holder for the clevis carried by a branch of the frame and a branch of the lever extending toward the rear of the plow, and formed with a handle.

4. A plow having a branched lever mounted to turn on the beam, a frame with forwardly and downwardly extended branches and secured to said lever, a wheel carried by a rigid branch of the frame, a holder for the clevis carried by a branch of the frame and a branch of the lever extending toward the rear of the plow, and formed with a handle, said branched lever being in joined parts divided by the beam of the plow, and a standard held by the plow to control the lever.

5. An attachment for plows consisting of a frame having two similar side pieces joined one for either side of the beam, tie-bolts for said side pieces one bolt piercing the beam and adapted to turn therein, a wheel carried on a tie-bolt, and a coupling-plate for receiving the clevis held by a tie-bolt, and a lengthened spring-lever secured to the side pieces of the frame, and means for controlling the spring-lever.

6. An attachment for plows, consisting of two similar right and left opposing main parts connected to form an open frame for the beam, a tie-bolt with shoulders and reduced threaded ends piercing said main parts of the frame and clamping-nuts for said threaded ends, and a wheel on the tie-bolt, a similar tie-bolt with clamping-nuts piercing other parts of the frame, and passing through the beam, and a coupling-plate with lugs between the main parts of the frame, and a bolt piercing said main parts and the lugs of the coupling-plate, and a tube on the bolt, the distance between the shoulders of said tie-bolts and the length of the tube being equal, and means for tilting the frame on the beam.

7. In a plow, a beam, a frame at the forward end thereof having forwardly-extended branches embracing opposite sides of the beam, and downwardly-extended branches, a wheel journaled in the lower ends of the downwardly-extended branches, a lever having portions upon opposite sides of the beam and branches at its forward end embracing the forward branches of the frame and secured thereto, said lever and frame having a pivot common to both, and means for engaging the upper and rear end of said lever as and for the purpose set forth.

In witness whereof I have hereunto set my hand, this 17th day of March, 1904, in the presence of two subscribing witnesses.

ALONZO CHASE.

Witnesses:
E. B. WHITMORE,
MINNIE SMITH.